No. 792,748.

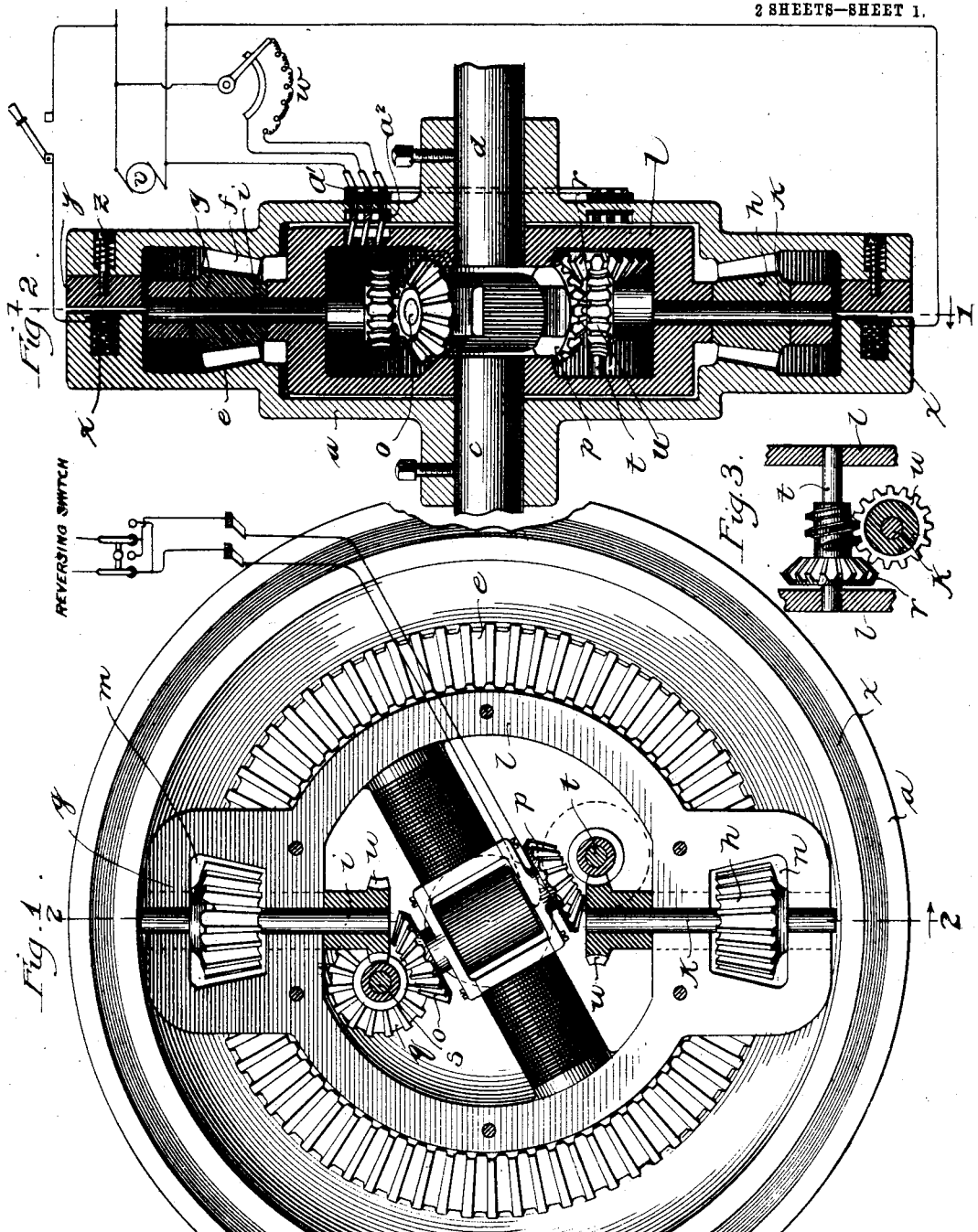

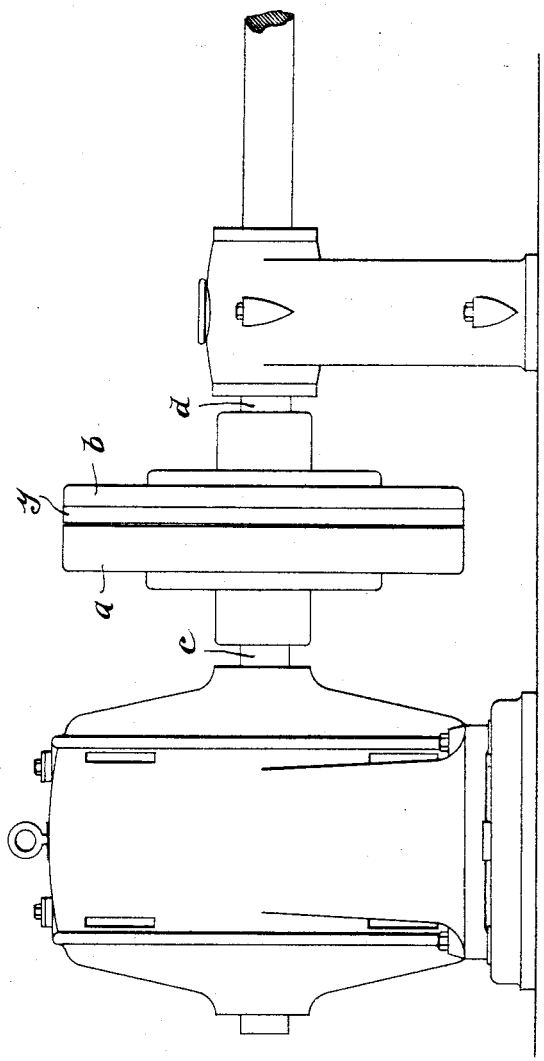

Patented June 20, 1905.

UNITED STATES PATENT OFFICE.

BION J. ARNOLD, OF CHICAGO, ILLINOIS.

POWER-TRANSMITTING MECHANISM.

SPECIFICATION forming part of Letters Patent No. 792,748, dated June 20, 1905.

Application filed January 31, 1900. Serial No. 3,405.

*To all whom it may concern:*

Be it known that I, BION J. ARNOLD, a citizen of the United States, residing at Chicago, in the county of Cook and State of Illinois, have invented a certain new and useful Improvement in Power-Transmitting Mechanism, (Case 1,) of which the following is a full, clear, concise, and exact description, reference being had to the accompanying drawings, forming a part of this specification.

My invention relates to power-transmitting mechanism, and has for its object the provision of an improved clutch for uniting driving and driven portions of machinery.

My invention relates more particularly to driving mechanism employing that class of clutches comprising two clutch members, one connected or adapted for connection with the driven element and the other having operative association with the driving element or prime mover.

Generally speaking, my invention in its preferred embodiment comprises an auxiliary mechanism or motor means adapted for operative connection with both clutch members, whereby rotary motion imparted to one member may be imparted to the other.

In practicing my invention I prefer to employ as a component part of the clutch mechanism a motor whose speed may be varied and which is capable of exerting power or turning effort upon the driven member of the clutch mechanism and the load connected therewith equal or proportional to that exerted by the main prime mover, so that the driven member of the clutch and the load operatively associated therewith may be gradually started from a state of rest to the speed desired without undue stress upon the main prime mover. Where the driven clutch member is to have the same speed of rotation with the driving clutch member, the said motor may be placed in a passive condition after the clutch members have been otherwise coupled. I preferably employ an electromagnetic clutch for uniting the clutch members when desired.

If it should be desired to increase or decrease the speed of the driven clutch member with relation to the driving clutch member, the speed of the clutch-motor may be increased or decreased.

My invention is of particular utility in connection with systems of alternating-current distribution in which synchronous motors are operated. By means of the invention the synchronous motor may be gradually brought to synchronism through the agency of the auxiliary motor. The invention is also capable of use in starting other prime movers from a state of rest—as, for example, in starting gas-engines or in bringing engines over dead-centers. In thus effecting the initial movement of prime movers the load is preferably temporarily held stationary, so that the auxiliary motor may react against it and bring the prime mover to speed. This may be done by a brake or by the application of the load. The auxiliary motor constructed in accordance with the preferred embodiment of my invention is provided with gearing which has operative engagement with corresponding gearing provided upon each of the clutch members, and upon applying power to the auxiliary motor and maintaining the load stationary temporarily the prime mover will be gradually brought to speed.

I will explain my invention more particularly by reference to the accompanying drawings, in which—

Figure 1 is a cross-sectional view, partially in elevation, on line 1 1 of Fig. 2. Fig. 2 is a section taken longitudinally of the shafts on line 2 2 of Fig. 1, a portion of the apparatus being shown in complete elevation. Fig. 3 is a view illustrating a portion of the gearing mechanism interposed between the auxiliary motor and the clutch members. Fig. 4 is a general view in elevation illustrative of my apparatus.

Like parts are indicated by similar characters of reference in the different views.

The clutch members illustrated are in the form of two opposed disks *a b*, rigidly secured to shafts *c d*, respectively. Either shaft may be the driving-shaft, suitably coupled with a prime mover, the remaining shaft being the driven shaft, operatively connected with the load. In the present instance we will assume for the sake of demonstration that the shaft $c$ is the driving-shaft and the shaft $d$ the driven shaft. The clutch members are provided with circular gears $e$ $f$ rigidly secured thereto and concentrically arranged with relation to the shafts, the gears being in this instance directly opposed to each other, but of the same diameter. I do not, however, wish to limit myself to this feature of construction.

The gears $e$ and $f$ may be engaged with each other through the agency of a pinion or pinions driven by an auxiliary motor. In this instance I have shown two pinions $g$ and $h$ secured upon the shaft-sections $i$ and $k$. The pinions $g$ and $h$ are preferably slightly beveled, as are also the gear-tracks $e$ and $f$, engaging the same. I prefer to employ the two or more pinions to secure a balanced construction. The shaft-sections $i$ and $k$ are journaled within a frame $l$. This frame is mounted to rotate upon the shafts $c$ $d$ and is provided with openings $m$ $n$ between the bearings for the shafts $i$ $k$ to receive the pinions $g$ $h$. Rotary effort is applied to each of the shafts $i$ $k$ by means of any suitable motor, which in this instance is disposed between the clutch members and carried by the frame $l$. I have shown an electric motor; but I do not wish to be limited to the precise form of motor employed, as other power may be advantageously used besides electricity. Where an electric motor is employed, the frame $l$ may be formed of iron and constitute a field-frame for the motor.

I have shown an armature between the two poles of the motor, this armature being provided with beveled pinions $o$ and $p$, which engage corresponding beveled pinions $q$ and $r$ upon shafts $s$ and $t$. The beveled pinions $q$ and $r$ are rigidly united with worms which engage worm-wheels $u$ $u$, secured upon the inner ends of the shafts $i$ $k$. I do not wish to be limited, however, to a construction wherein both shafts $i$ and $k$ are driven by the motor, as the motor may operate through the agency of a single driven shaft $i$ or $k$.

I have illustrated diagrammatically a suitable source of current $v$, which may be included in circuit with the armature and field of the motor by means of a rheostat $w$, the rheostat serving to control the speed of the armature. When the switch of the rheostat is opened, the power supplied to the motor ceases. I have indicated a magnetic clutch to supplement the clutch-motor to effect engagement between the clutch members in place of the auxiliary motor when it is desired to have the clutch members rotate at the same speed. This magnetic clutch is of well-known construction, comprising an energizing-coil $x$, carried by one clutch member $a$ and opposed to a longitudinally-movable magnetic ring $y$, carried upon the other clutch member, spring mechanism $z$ being employed to separate the magnetic ring from the clutch member $a$ when current through the coil $x$ is discontinued. I have illustrated two sets of collector-rings $a'$ and $a^2$ on the member $b$, each set comprising, preferably, three separated and insulated rings, corresponding rings being electrically connected by means of suitable conductors passing through the said member. Two sets of brushes are also preferably employed to engage the said collector-rings, one set being preferably stationarily mounted upon the outside of the driving mechanism, while the remaining set is mounted preferably upon the frame $l$ and is in direct electrical communication with the motor-terminals. If the two clutch members are to rotate at the same speed, either the auxiliary magnetic clutch must effect engagement between the clutch members or in certain constructions the current must be maintained through the motor or the motor and its gearing otherwise locked to maintain the motor, and consequently the gears $g$ and $h$, stationary with respect to both clutch members, while in the construction illustrated in the figures the gearing is adapted likewise to lock the two parts of the driving mechanism in place.

While I have shown a supplemental magnetic clutching device for directly uniting the clutch members, I do not wish to be limited thereto.

The operation of the device of my invention may be described as follows: Supposing that the shaft $c$ is connected with a suitable prime mover, as a synchronous motor, which should be started and in the case of a synchronous motor brought to speed before the said prime mover is connected with the shaft $d$, the rheostat-arm closes current through the motor, the amount of current passed through the armature being gradually increased to the required speed. The gear $f$ upon the clutch member $b$ acts as a stationary track, and if the load upon the shaft $d$ is not sufficient to keep the clutch member $b$ and track $f$ stationary braking influence may be also exerted upon the said shaft in any desired manner. The motor will then effect the rotation of the pinions $g$ and $h$ through the medium of the gearing interposed between the said pinions and the armature, whereby the rotation of the clutch member $a$ is effected, the speed of rotation being controlled, as above stated, by the amount of current or other power supplied to the motor. After the prime mover has been brought to speed the load should be gradually brought to its speed to avoid undue stress upon the prime mover, and especially in the case of synchronous motors, to avoid undue taxation upon the generating-station. This result may be accomplished by reversing the current through the armature, thereby tending to reverse the direction of rotation of the armature in a well-known manner, the armature gradually decreasing in velocity, so that the load is gradually started, the speed of the auxiliary or clutch motor being gradually decreased and the speed of the driven member of the clutch gradually increased until the driven shaft is brought to the required speed. The means for reversing and controlling the current through the motor constitutes a means for partially or totally checking its own speed, either to partially or totally prevent the rotation of the pinions $g$ and $h$, or if sufficient current is passed in a reversed direction the pinions $g$ and $h$ may be reversed in rotation. I have shown an electric auxiliary motor to effect a desired operation of which the power supplied to the same is reversed; but other clutch-motors may be employed and other means used for checking the speed and reversing the direction thereof, and I therefore desire to claim the invention broadly in this respect. While in the present instance I reverse the power applied to the motor, I do not wish to be limited to this practice. The motor and the pinions $g$ and $h$ will thus act as an elastic bond or coupling between the two members of the clutch. If it should be desired to rotate the clutch member $b$ faster or slower than the clutch member $a$, then the speeds of the auxiliary motor should be respectively such that the frame $l$ will rotate faster or slower than the driving-shaft $c$. In either of these latter conditions of use the clutch-coil $x$ should of course be de-energized.

In the claims I have used the terms "pinion" and "gear" to designate the part that is driven by the auxiliary motor and the gearing engaging the same and I have herein disclosed pinions and gears provided with teeth. I do not wish to be limited to the form of gearing disclosed nor to a construction wherein the gear driven by the auxiliary motor is smaller than the gear engaging the same.

It will be seen that I have devised a new power-transmission mechanism in which power that is to be communicated from the element $c$ is divided between the motor mechanism and the load $d$, the power being divided into two always-equal parts, one part of the power acting to resist the action of the clutch-motor, while the other part of the power operates the load $d$. The motor constitutes a variable and controllable load and the preferred form a substantially frictionless load.

In certain of the claims I speak of means for dividing the power derived from a given source (the element $c$) as always being divided into two equal parts; but it is obvious that the apparatus may be so adjusted that the clutch-motor interposed between the clutch members may not be acting to couple the clutch members, as when the magnetic clutch is substituted therefor. In such a case the organization of course is transformed, and I do not wish to be limited to a structure in which such transformation may not take place.

It will also be seen that I have devised mechanism for transmitting power derived from a given source comprising a train of differential gears, (meaning gears of the same or different sizes,) means for transmitting power to one member of the train, and means for connecting the other member of the train to a load, there being also provided means for imposing upon a remaining member of the gear a load of that quantity which when divided by the resistance offered by the load attached to the second member gives therein the speed required. It will be apparent that this organization also contains means for restraining by substantially a frictionless load the speed of a member of the gear-train to produce a resultant speed in a remaining member of the gear-train, there being also occasioned a resultant torque, the speed and torque being thus adjustable. The clutch-motor may also be said to constitute a converter of power.

The structure herein disclosed constitutes the preferred form of apparatus, including a train of differential gears, means for transmitting power to one member of the train, means for restraining by a substantially frictionless load a second member, whereby the remaining member is caused to rotate at a speed varied with the measure of the reaction produced in the second member provided by the resistance which the remaining member encounters, and means for transmitting power developed in said remaining member; but I do not wish to be limited to the precise construction that I have devised for carrying out the invention.

While I have herein shown and particularly described the preferred embodiment of my invention, I do not wish to be limited to the precise apparatus shown nor to the precise means for varying the power supplied to the motor; but,

Having thus described my invention, I claim as new and desire to secure by Letters Patent—

1. In a power-transmitting mechanism, the combination with a prime mover, of a driving member operated by the prime mover, a driven member, and an auxiliary motor, operatively associated with both of said members and serving to physically engage the same, substantially as described.

2. In a power-transmitting mechanism, the combination with a prime mover, of a gear driven thereby, a driven member and an auxiliary motor adapted for simultaneous engagement with the gear and the driven member, substantially as described.

3. In a power-transmitting mechanism, the combination with a prime mover, of a driven member provided with a gear, and an auxiliary motor adapted for simultaneous engagement with the said gear and prime mover, substantially as described.

4. In a power-transmitting mechanism, the combination with the driving and driven members of a clutch, of a motor serving to start the driving member and to couple the driven member with the driving member and an element driven by the motor interposed between and engaging both the driving and driven members, substantially as described.

5. In a power-transmitting mechanism, the combination with a prime mover, of a gear operated thereby, a driven member having a gear, and an auxiliary motor adapted for simultaneous engagement with the said gears substantially as described.

6. In a power-transmitting mechanism, the combination with a prime mover, of a clutch including a driving and a driven member, an auxiliary motor constituting the power connection between the said members of the clutch, and an element driven by the auxiliary motor interposed between and engaging both driving and driven members the prime mover thereby transmitting power to the driven member of the clutch through the agency of the driving member and the auxiliary motor interconnecting the clutch members, substantially as described.

7. In a power-transmitting mechanism, the combination with the driving and driven members of a clutch, of a motor, a support therefor that is rotatable independently of a clutch member, a pinion to be driven by the motor, and a gear provided upon each of said clutch members, said gears being both engaged by said pinion whereby the members of the clutch are engaged, substantially as described.

8. In a power-transmitting mechanism, the combination with the driving and driven members of a clutch, of a motor, a support therefor that is rotatable independently of a clutch member, a pinion to be driven by the motor, a gear provided upon each of said clutch members, said gears being both engaged by said pinion whereby the members of the clutch are engaged, and means for varying the speed of the motor, substantially as described.

9. In a power-transmitting mechanism, the combination with the driving and driven members of a clutch, of a motor, a support therefor that is rotatable independently of both clutch members, a pinion to be driven by the motor, and a gear provided upon each of said clutch members, said gears being both engaged by said pinion whereby the members of the clutch are engaged, substantially as described.

10. In a power-transmitting mechanism, the combination with the driving and driven members of a clutch, of a motor, a support therefor that is rotatable independently of both clutch members, a pinion to be driven by the motor, a gear provided upon each of the clutch members, said gears being both engaged by said pinion whereby the members of the clutch are engaged, and means for varying the speed of the clutch-motor, substantially as described.

11. In a power-transmitting mechanism, the combination with the driving and driven members of a clutch, of a motor operatively associated with both clutch members and serving to couple or engage the same, and supplemental clutching means to engage the clutch members when rotating at the same speed, independently of the motor whereupon the supply of power to the motor may be caused to cease, substantially as described.

12. In a power-transmitting mechanism, the combination with the driving and driven members of a clutch, of a motor operatively associated with both clutch members and serving to couple or engage the same, means for varying the speed of the motor, and supplemental clutching means to engage the clutch members when rotating at the same speed, independently of the motor, whereupon the supply of power to the motor may be caused to cease, substantially as described.

13. In a power-transmitting mechanism, the combination with the driving and driven members of a clutch, of a motor, a pinion to be driven thereby, a gear provided upon each of said clutch members, said gears being both engaged by said pinion, whereby the members of the clutch are engaged, and supplemental clutching means to engage the clutch members when rotating at the same speed, independently of the motor, whereupon the supply of power to the motor may be caused to cease, substantially as described.

14. In a power-transmitting mechanism, the combination with the driving and driven members of a clutch, of a motor, a pinion to be driven thereby, a gear provided upon each of said clutch members, said gears being both engaged by said pinion whereby the members of the clutch may be engaged, means for varying the speed of the motor, and supplemental clutching means to engage the clutch members when rotating at the same speed, independently of the motor, whereupon the supply of power to the motor may be caused to cease, substantially as described.

15. In a power-transmitting mechanism, the combination with the driving and driven members of a clutch which are opposed, of gears provided upon the inner, opposed faces of the clutch members, said gears being directly opposed, of substantially equal diameter and concentric with the axis of rotation, a pinion interposed between and engaging both gears, and a motor for driving said pinion, substantially as described.

16. In a power-transmitting mechanism, the combination with the driving and driven members of a clutch which are opposed, of gears provided upon the inner, opposed faces of the clutch members, said gears being directly opposed, of substantially equal diameter and concentric with the axis of rotation, a pinion interposed between and engaging both gears, a motor for driving said pinion, and a supplemental clutching means for uniting said clutch members independently of the motor, substantially as described.

17. In a power-transmitting mechanism, the combination with the driving and driven members of a clutch which are opposed, of gears provided upon the inner opposed faces of the clutch members, said gears being directly opposed, of substantially equal diameter and concentric with the axis of rotation, a pinion interposed between and engaging both gears, a motor for driving said pinion, and a frame for supporting the motor which is rotatable independently of a clutch member, substantially as described.

18. In a power-transmitting mechanism, the combination with the driving and driven members of a clutch which are opposed, of gears provided upon the inner opposed faces of the clutch members, said gears being directly opposed, of substantially equal diameter and concentric with the axis of rotation, a pinion interposed between and engaging both gears, a motor for driving said pinion, a supplemental clutching means for uniting said clutch members independently of the motor, and a frame for supporting the motor which is rotatable independently of a clutch member, substantially as described.

19. In a power-transmitting mechanism, the combination with the driving and driven members of a clutch, which are opposed, of gears provided upon the inner opposed faces of the clutch members, said gears being directly opposed, of substantially equal diameter and concentric with the axis of rotation, a pinion interposed between and engaging both gears, a motor for driving said pinion, and a frame for supporting the motor which is rotatable independently of either clutch member, substantially as described.

20. In a power-transmitting mechanism, the combination with the driving and driven members of a clutch which are opposed, of gears provided upon the inner opposed faces of the clutch members, said gears being directly opposed, of substantially equal diameter and concentric with the axis of rotation, a pinion interposed between and engaging both gears, a motor for driving said pinion, a supplemental clutching means for uniting said clutch members independently of the motor, and a frame for supporting the motor which is rotatable independently of either clutch member, substantially as described.

21. In a power-transmitting mechanism, the combination with a prime mover, of a driving member operated thereby, a driven member, an auxiliary motor, a pinion to be driven thereby, and a gear provided upon each of said members, the said gears engaging the said pinion, substantially as described.

22. In a power-transmitting mechanism, the combination with the driving and driven members of a clutch, of a motor serving to start the driving member and to couple the driven member with the driving member, an element driven by the motor and interposed between and engaging the driving and driven members of the clutch and means for reversing the power applied to the motor, substantially as described.

23. In a power-transmitting mechanism, the combination with a prime mover, of a driving member operated thereby, a driven member, an auxiliary motor, a pinion driven thereby, a gear provided upon each of said members, said gears being both engaged by said pinion, whereby said members are engaged, and means for varying the speed of the auxiliary motor, substantially as described.

24. In a power-transmitting mechanism, the combination with a prime mover, of a clutch including a driving and a driven member, an electric auxiliary motor constituting the power connection between the said members of the clutch, and an element driven by the auxiliary motor interposed between and engaging both driving and driven members the prime mover thereby transmitting power to the driven member of the clutch through the agency of the driving member and the auxiliary motor interconnecting the clutch members, substantially as described.

25. In an apparatus for transmitting power derived from a given source, a train of gears, means for transmitting power to one member of the train, means for imposing upon another member a substantially frictionless load producing in the remaining member a resultant torque, substantially as described.

26. In an apparatus for transmitting power derived from a given source, a train of gears, means for transmitting power to one member of the train and means for imposing upon another member a substantially frictionless and controllable load and producing in the remaining member a variable torque, substantially as described.

27. In an apparatus for transmitting power derived from a given source, a train of gears, means for conveying said power to and driving one member of the train, means for connecting a load with another member, a dynamo forming a load, means for connecting said dynamo with the remaining member so that effects of speed may be produced at will in the member connected with the first-mentioned load, substantially as described.

28. In an apparatus for transmitting power derived from a given source, a train of gears, means for transmitting power to and continuously driving one member of the train, means for connecting a load to another member, a converter of power connected with the remaining member and means for regulating the duty performed by the converter so that the effort produced in the member connected with the load may be governed by controlling the resistance offered by the converter, substantially as described.

29. In an apparatus for transmitting power derived from a given source, a train of gears, means for transmitting and continuously driving one member of the train, means for connecting a load to another member, a dynamo connected with the remaining member and means for regulating the duty done by the dynamo so that the effort produced in the member connected with the load may be governed by controlling the resistance offered by the dynamo, substantially as described.

30. In an apparatus for transmitting power derived from a given source, means for dividing this power into two equal parts, means for conveying one of these parts toward the performance of any desired work, means for conveying the other part for the performance of independent work and means for governing a load substantially frictionless carried by the means for conveying the second part, whereby the work done by the first part is controlled, substantially as described.

31. In an apparatus of the class described, a train of gears, means for continuously driving one member of the train, means for connecting a load with the second member and means substantially frictionless for controlling the relative speed of rotation between the first and third members, substantially as described.

In witness whereof I hereunto subscribe my name this 26th day of January, A. D. 1900.

BION J. ARNOLD.

Witnesses:
CHARLES A. BROWN,
CHARLES E. HUBERT.